(12) United States Patent
Jones

(10) Patent No.: US 7,665,287 B2
(45) Date of Patent: Feb. 23, 2010

(54) CRANK ARM STOP FOR A CAM REEL

(75) Inventor: Dennis J. Jones, Menota, IL (US)

(73) Assignee: HCC, Inc., Mendota, IL (US)

( * ) Notice: Subject to any disclaimer, the term of this patent is extended or adjusted under 35 U.S.C. 154(b) by 147 days.

(21) Appl. No.: 11/772,585

(22) Filed: Jul. 2, 2007

(65) Prior Publication Data

US 2008/0022647 A1    Jan. 31, 2008

Related U.S. Application Data

(60) Provisional application No. 60/820,518, filed on Jul. 27, 2006.

(51) Int. Cl.
*A01D 89/00* (2006.01)
*A01D 57/02* (2006.01)

(52) U.S. Cl. .......................... 56/364; 56/226

(58) Field of Classification Search ................. 56/16.1, 56/219–221, 226, 227, 364, 400
See application file for complete search history.

(56) References Cited

U.S. PATENT DOCUMENTS

| | | | |
|---|---|---|---|
| 507,255 A | 10/1893 | Benroth | |
| 1,035,485 A | 8/1912 | Sletto | |
| 1,727,709 A | 9/1929 | Johnston et al. | |
| 1,794,646 A | 3/1931 | Schueler | |
| 2,388,212 A | 10/1945 | McElhoe et al. | |
| 2,669,081 A | 2/1954 | Weems et al. | |
| 2,694,894 A | 11/1954 | Linscheid | |
| 2,823,511 A | 2/1958 | Beaty | |
| 3,472,008 A * | 10/1969 | Hurlburt | 56/226 |
| 3,546,863 A | 12/1970 | Connolly | |
| 3,552,454 A | 1/1971 | Deming | |
| 3,698,166 A * | 10/1972 | Fisher | 56/220 |
| 3,910,020 A * | 10/1975 | Spindler | 56/370 |
| 3,940,910 A | 3/1976 | d'Acremont | |
| 4,008,558 A | 2/1977 | Mott | |
| 4,067,177 A * | 1/1978 | Tout | 56/226 |
| 4,156,340 A | 5/1979 | Colgan et al. | |
| 4,353,201 A | 10/1982 | Pierce et al. | |
| 5,007,235 A | 4/1991 | Nickel et al. | |

(Continued)

FOREIGN PATENT DOCUMENTS

EP    0 280 790 A1    9/1988

*Primary Examiner*—Robert E Pezzuto
*Assistant Examiner*—Joan D Misa
(74) *Attorney, Agent, or Firm*—Trexler, Bushnell, Giangiorgi, Blackstone & Marr, Ltd

(57) ABSTRACT

A pickup reel for a harvester which includes stops for preventing over-rotation of bat tubes. The pickup reel includes a main shaft and a plurality of reel arms which extend from the main shaft. A bat tube is engaged with an end of each of the reel arms. More specifically, the pickup reel includes a plurality of bat tubes, all of which are parallel to each other and parallel to the main shaft of the pickup reel. Each bat tube carries a plurality of tines and is supported by a plurality of reel arms which extend from the main shaft. Associated with each bat tube are a plurality of stops for defining the range of allowable rotation of the respective bat tube. By restricting the amount the bat tubes can rotate, crop does not tend to get wrapped around the bat tubes during operation of the harvester.

11 Claims, 10 Drawing Sheets

U.S. PATENT DOCUMENTS

| | | |
|---|---|---|
| 5,566,536 A | 10/1996 | Krafka et al. |
| 5,595,052 A * | 1/1997 | Jasper et al. .................. 56/220 |
| 5,595,053 A | 1/1997 | Jasper et al. |
| 5,768,870 A | 6/1998 | Talbot et al. |
| 5,987,861 A | 11/1999 | Duncan et al. |
| 6,036,123 A | 3/2000 | West |
| 6,170,244 B1 | 1/2001 | Coers et al. |
| 6,502,379 B1 | 1/2003 | Snider |
| 6,591,598 B2 | 7/2003 | Remillard et al. |
| 2002/0148210 A1 | 10/2002 | Bickel |

* cited by examiner

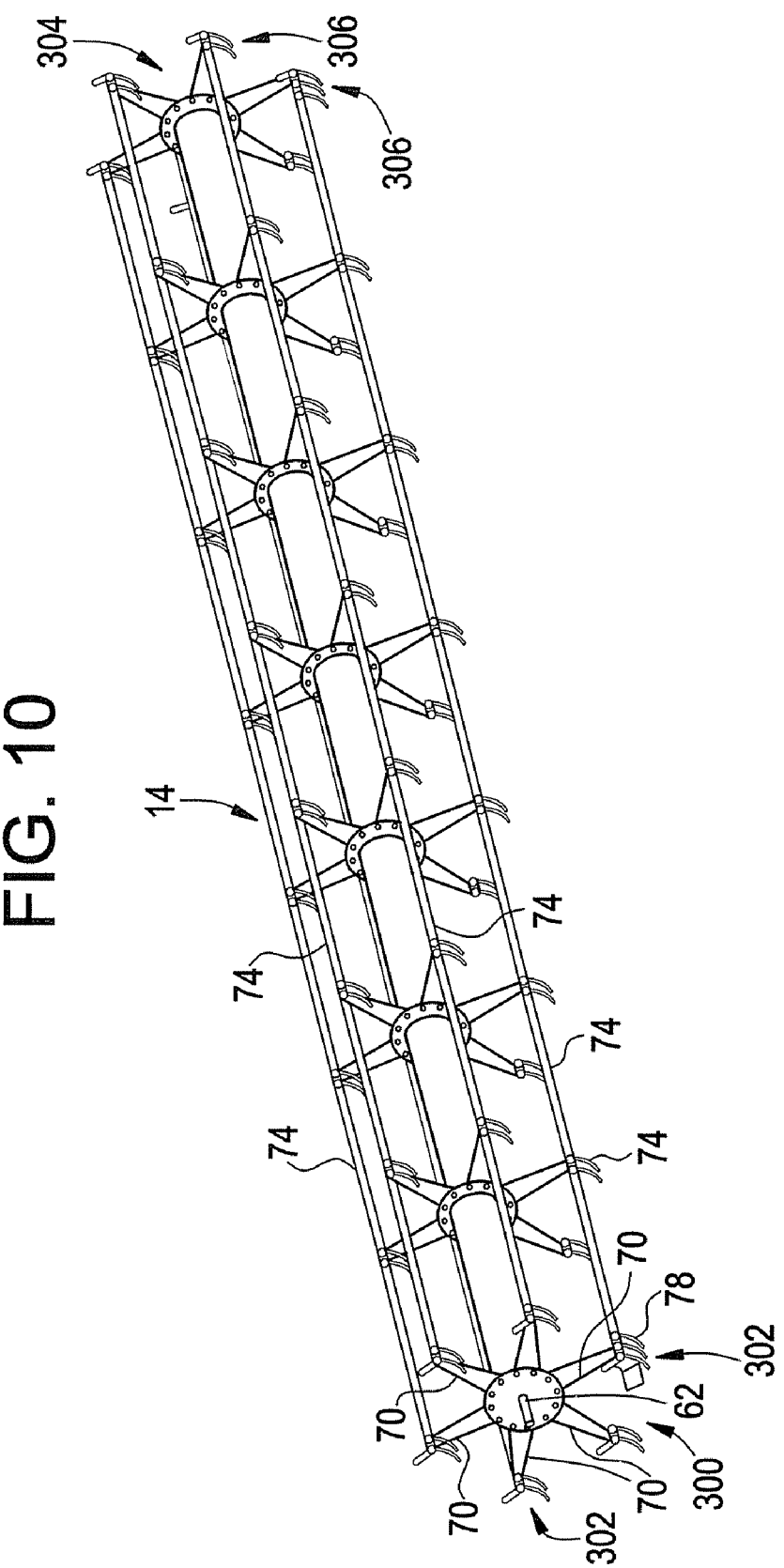

CRANK ARM STOP FOR A CAM REEL

RELATED APPLICATION

Priority Claim

This application claims the benefit of U.S. Provisional Application Ser. No. 60/820,518, filed Jul. 27, 2006, which is hereby incorporated herein by reference in its entirety.

BACKGROUND

The present invention generally relates to pickup reels for harvesters, and more specifically relates to a crank arm stop for a pickup reel.

U.S. patent application Ser. No. 10/102,164 discloses a harvester pickup reel which solves many problems experienced in the prior art. The present invention is an improvement on that design. As such, U.S. patent application Ser. No. 10/102,164 (hereinafter "the '164 application") is hereby incorporated herein by reference in its entirety. FIGS. 1-5 of the present application are from the '164 application and will now be described to provide some background with regard to a possible environment of the present invention.

A harvester 10 including a cam path pickup reel 14 and a cam arrangement retainer 18 is illustrated in FIG. 1. The harvester 10 includes a harvesting platform 22 including a platform frame 26 supported for movement over ground and side and rear walls 30. A floor 34 extends between the opposite side walls 30. A transverse crop converging auger 38 is rotatably supported above the floor 34 and forward of the rear wall 30. A transverse cutter bar 42 is mounted along the forward edge of the floor 34, and an upright crop dam 46 is supported between the cutter bar 42 and the floor 34.

The pickup reel 14 generally spans the width of the platform 22, forward of the auger 38 and above the cutter bar 42. The pickup reel 14 is connected to the platform 22 by a pair of reel support arms 50 (one shown) which support the pickup reel 14 on the frame 26. In the illustrated construction, the support arms 50 are pivotally connected to the frame 26 at pivot points 54. The support arms 50 are generally above the side walls 30 of the platform 22. Preferably, the support arms 50 are selectively vertically adjustable by a pair of cylinders (not shown) connected between the support arms 50 and the side walls 30.

Movable support structures 58 are supported at the forward ends of each support arm 50. The support structures 58 are generally slidable between forward and rearward positions on the support arms 50, and their movement is controlled by a pair of cylinders (not shown). The support arms 50 and the support structures 58 are adjustably positioned to adjust the position of the pickup reel 14 relative to the platform 22.

A tubular reel shaft or first shaft 62 is journalled by and extends between the support structures 58. The first shaft 62 is rotatable relative to the support structures 58 about its axis. A plurality of axially-spaced, radially-extending members or spiders 66 are supported on the first shaft 62 for rotation with the first shaft 62. Each spider 66 includes a plurality of radially-extending arms 70 (six in the illustrated construction) which are axially aligned with the arms 70 on adjacent spiders 66 to form sets of arms 70.

A transverse bat tube, rockshaft or second shaft 74 is journalled in the outer ends of each set of arms 70. The second shafts 74 are rotatable with the associated arms 70 and are rotatable relative to the associated radially-extending arms 70. The second shafts 74 span the width of the pickup reel 14 and are generally parallel to and radially spaced from the first shaft 62. A crank arm 76 (one shown) is connected to the opposite ends of each second shaft 74 to rotate the second shaft 74 about its axis relative to the associated anus 70. A plurality of harvesting tines 78 are connected to each second shaft 74 for rotation with the second shaft 74. Each tine 78 has a tip 82 which is movable along a tip path 86 (shown in detail in FIG. 2).

A cam path arrangement 90 defines the tip path 86 and, in the illustrated construction, includes (see FIGS. 1-4) a pair of cams 94 (one shown) supported at each end of the pickup reel 14. In other constructions (not shown), only a single cam 94 may be used.

In the illustrated construction, the cams 94 control the angular position of the second shafts 74 and the tines 78. Each cam 94 defines a cam path 96 and includes an inner cam ring 98, having a cam surface 100, and an outer cam ring 102, spaced radially outwardly of the inner cam ring 98 and having a cam surface 104. The inner and outer cam rings 98 and 102 define a cam track or cam channel 108.

The cam path arrangement 90 also includes a cam follower 112 engageable with the cam 94 and rotatably supported on (see FIG. 4) a cam follower stud 114 connected to each crank arm 76. As shown in FIGS. 1-2 and 4, the cam followers 112 are movable along the cam path 96. Rotation of the first shaft 62 and movement of the cam follower 112 along the cam path 96 cooperate to cause the tips 82 to move along the selected tip path 86.

In the illustrated construction, the cam follower 112 is (see FIG. 4) a shouldered or flanged cam follower. In the illustrated construction, the cam follower 112 includes a first flange portion 116, providing a first retainer surface, a second flange portion 120, axially spaced from the first flange portion and providing a second retainer surface, and an intermediate portion 124, between and having a reduced diameter relative to the first and second flange portions 116 and 120.

In some constructions, the cam follower 112 also includes (see FIG. 5) a cam follower sleeve 128 rotatably supported on the intermediate portion 124 of the cam follower body to reduce the wear on the cam follower 112 and on the cam 94. In FIG. 5, reference numeral 99 identifies a spacer and reference numeral 101 identifies an end shield (i.e., cam support).

In the illustrated construction, the cam 94 and the cam follower 112 cooperate to provide the cam path arrangement retainer 18. Specifically, the inner and outer cam rings 98 and 102 cooperate to capture the cam follower 112, and the first and second flanges 116 and 120 on the cam follower 112 capture the inner and outer cam rings 98 and 102. As a result, the retainer 18 retains the cam follower 112 remains in engagement with the cam 94 during movement of the cam follower 112 along the cam path 96. The retainer 18 prevents unwanted axial movement of the cam follower 112 relative to the cam 94 (i.e., "falling out" of the cam 94).

The cam path arrangement 90 may be configured to provide any tip path. In the illustrated construction, the cam path arrangement 90 is configured to provide a cam path similar to that shown in U.S. Pat. No. 6,170,244, which is hereby incorporated by reference.

FIG. 2 illustrates the tip path 86 in greater detail. A crop engagement region 138 is shown between two radial lines, approximately from a seven o'clock position to a four o'clock position as the pickup reel 14 rotates counterclockwise (in FIG. 2). The crop engagement region 138 has various zones in which the attitude or pitch of the tines 78 is varied to improve the handling of crop by the pickup reel 14.

In an approach zone 140, the tines 78 extend outwardly from the pickup reel 14, and the tips 82 move in a generally horizontal path to sweep the ground forward of the cutter bar 42. As the cam followers 112 move along the corresponding approach portion of the cam path 96, the second shafts 74 are rotated slightly, relative to the ground, in a counterclockwise direction (in FIG. 2) to maintain the tips 82 in a generally horizontal path. The approach zone 140 ends generally at the position of the tine 78a.

After the approach zone 140, the tines 78 move through a lift zone 144, in which, as the cam followers 112 move along the corresponding lift portion of the cam path 96, the second shafts 74 are rotated further in the counterclockwise direction, relative to the ground, to lift the tips 82 and the crop over the cutter bar 42 and over the crop dam 46. The lift zone 144 ends generally at the position of the tines 78b.

Following the lift zone 144, the tines 78 sweep over the forward portion of the floor 34, at the beginning of a release zone 148. In the release zone 148, as the cam followers 112 move along the corresponding release portion of the cam path 96, the second shafts 74 are rotated in a clockwise direction (in FIG. 2) relative to the ground. This rotation causes the tines 78 to move to a more vertical orientation and allows any crop on the tines 78 to fall to the platform 22. The tines 78 continue to rotate clockwise after the release zone 148 so that the tips 82 clear the auger 38. The clockwise rotation of the tines 78 in and following the release zone 148 allows the tines 78 to sweep over the forward portion of the floor 34 and still clear the auger 38.

In the approach zone 140, the tines 78 are at an angle 152 relative to a radial plane 154, advanced in the counterclockwise direction of rotation of the pickup reel 14. In the release zone 148, the second shaft 74 is rotated clockwise, moving the tines 78 through a zero angle relative to a radial plane 156 to an angle 160 relative to a radial plane 162, delayed in the counterclockwise direction of rotation of the pickup reel 14. Between the eleven and ten o'clock positions of the pickup reel 14, the second shafts 74 are rotated counterclockwise to flip the tines 78 over to an advanced angle as the tines 78 prepare to again enter the approach zone 140.

As shown in FIGS. 1 and 3, the cam 94 is preferably formed of multiple cam segments, such as cam segments 164, 166, 168 and 170. The cam segments 164, 166, 168 and 170 are connected at their ends by fasteners 172 to provide the endless cam path 96. If a different or second cam path (not shown but different than the first cam path 96) is desired, for example, in the crop engagement region 138, the first cam segment 164 may be removed and replaced with another cam segment (not shown) having a different cam path portion to provide a different cam path.

Also, in the crop engagement region 138, the cam segment 164 is subject to greater wear. The construction of the cam 94 as cam segments 164, 166, 168 and 170 allow the more worn cam segment (for example, cam segment 164) to be replaced without requiring replacement of the entire cam 94.

The earn path retainer arrangement 18 prevents the cam follower 112 from falling out of the earn channel 108 of the cam 94 as the earn follower 112 moves along the cam path 96. The earn follower 112 is preferably flanged, thereby being captured between the inner and outer earn rings 98 and 102 during assembly. As the pickup reel 14 rotates, the cam follower 112 tracking in the cam channel 108 and moving along the earn path 96 varies the pitch of the tines 78 on the bat tube or second shaft 74.

The flange portions 116 and 120 on the earn follower 112 substantially eliminate the possibility of the cam follower 112 falling out of the cam 94 as can happen with a follower in a C-shaped channel without a retainer arrangement (such as a retainer plate at the outer end of the C-shaped channel). Construction of the cam 94 as inner and outer cam rings 98 and 102 in combination with the flange cam follower 112 prevents the cam follower 112 from falling out of the earn 94.

The illustrated cam path arrangement 90 provides for infinitely variable cam paths 96 (one shown) with little or no tooling or replacement parts required. The cam path arrangement 90 provides cam actuated pitch control for the pickup reel 14. The pitch control of the tines 78 is done via the eccentric and, possibly, non-circular earn 94 connected to the bat tube or second shaft 74 through the cam follower 112 connected to the crank arm 76 on each second shaft 74. The cam 94 is preferably stationary and includes the inner and outer cam rings 98 and 102 to establish and define the cam path 96.

Also, construction of the cam 94 as inner and outer cam rings 98 and 102 and as cam segments 164, 166, 168 and 170 results in easier assembly of the cam 94 and easier installation of the cam followers 112. In addition, construction of the cam 94 as inner and outer cam rings 98 and 102 requires no special tooling to make an infinite variety of cams 94 (one shown) defining an infinite variety of cam paths 96 (one shown). The components of the cam 94 can be manufactured by any method such as laser cutting, water jet cutting, etc.

It should be understood that, in other constructions (not shown), the retainer may have a different construction to retain the cam follower in engagement with the cam during movement of the cam follower along the cam path. For example, in another construction, the cam may be formed as a generally C-shaped channel, such as that illustrated in U.S. Pat. No. 6,170,244. In such a construction, the C-shaped channel is open on the axially-inward side of the cam. To retain the cam follower in such a C-shaped channel, a retainer plate may be connected to the open side of the C-shaped cam channel to provide a reduced, more narrow opening through which, the cam follower cannot fit. Such a retainer plate would prevent the cam follower from "falling out" of or disengaging from the C-shaped channel during movement of the cam follower along such a cam path.

While FIGS. 1-5 illustrate a pickup reel for a harvester, where the design solves many problems experienced in the prior art (discussed at length in the '164 application), the present invention adds structure to the design to effectively prevent the bat tubes 74 from reversing as the pickup reel rotates. Reversing of the bat tubes by the cam followers going "over center" at the transition points is disadvantageous as it will cause the tines to enter the crop at the wrong angle, causing crop damage and ineffective feeding of the crop into the harvesting machine.

OBJECTS AND SUMMARY

An object of an embodiment of the present invention is to provide a pickup reel which includes bat tubes and which is configured to prevent the bat tubes from over-rotating during operation Another object of an embodiment of the present invention is to provide a pickup reel which includes a plurality of stops which are configured to contact at least one tine on a bat tube, thereby preventing the bat tube from rotating past a certain point.

Briefly, and in accordance with at least one of the foregoing objects, an embodiment of the present invention provides a pickup reel for a harvester. The pickup reel includes a main shaft and a plurality of reel arms which extend from the main shaft. A bat tube is engaged with an end of each of the reel arms. More specifically, the pickup reel includes a plurality of bat tubes, all of which are parallel to each other and parallel to the main shaft of the pickup reel. Each bat tube carries a plurality of tines and is supported by a plurality of reel arms which extend from the main shaft. A crank arm is disposed proximate the ends of each bat tube, and a cam follower is engaged with each crank arm and travels in a cam path. Associated with each bat tube are a plurality of stops for defining the range of allowable rotation of the bat tube.

In a specific embodiment (with other variations being possible), there is a pair of stops provided proximate at least one end of each bat tube. The stops are attached to the reel arms at the end of the pickup reel, and the stops are configured to contact at least one of the tines on the reel arm during operation of the pickup reel, thereby preventing the bat tube from over-rotating. Preferably, both stops are secured to the reel arm with a single fastener. Additionally, preferably each stop is configured such that the stop can be readily implemented at either end of a bat tube.

BRIEF DESCRIPTION OF THE DRAWINGS

The organization and manner of the structure and operation of the invention, together with further objects and advantages thereof, may best be understood by reference to the following description, taken in connection with the accompanying drawing, wherein:

FIG. 10 is a perspective view of a pickup reel.

DESCRIPTION

Figure 1:
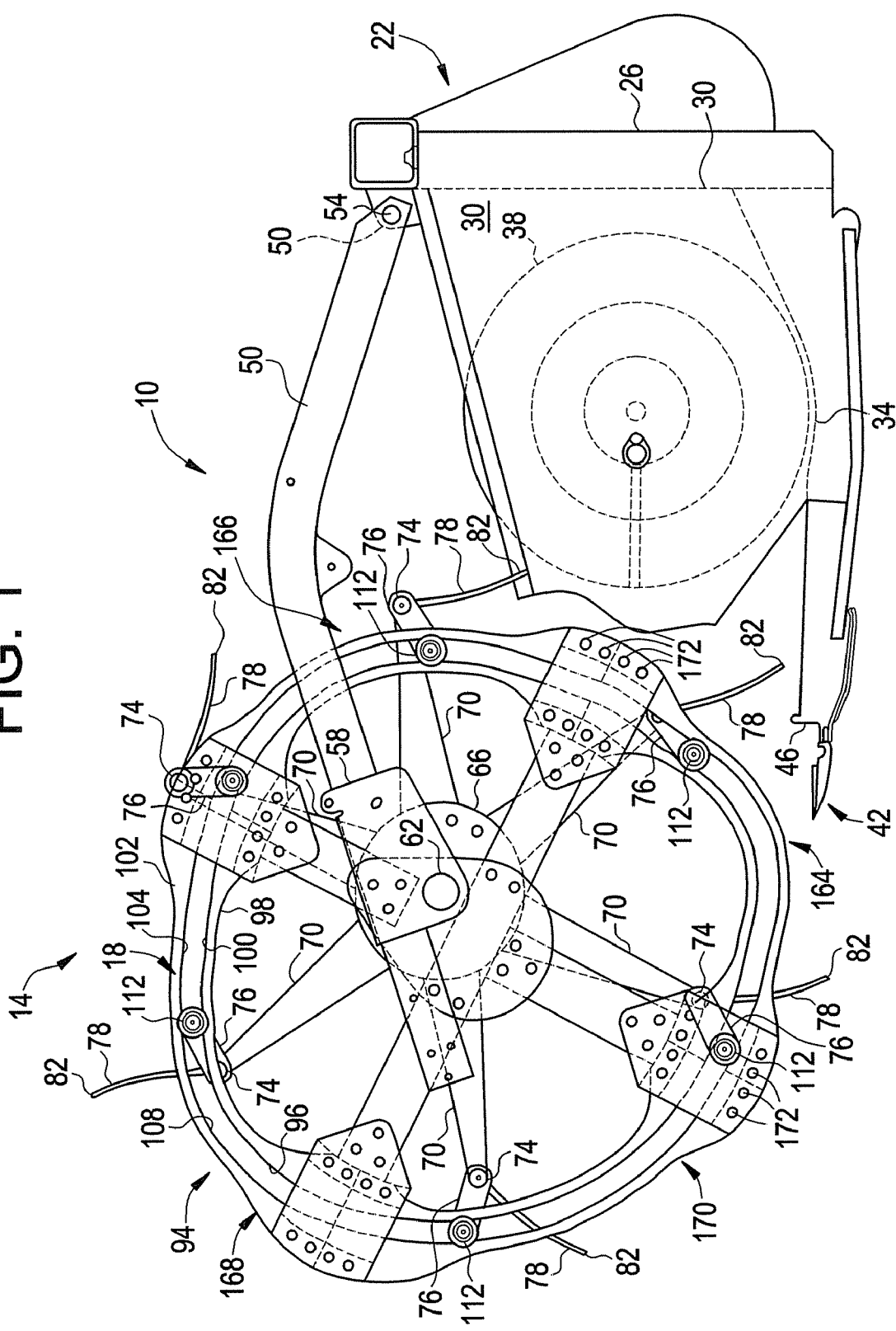
FIG. 1 is a side view of a harvester including a cam pickup reel and a cam path arrangement retainer.
Figure 2:
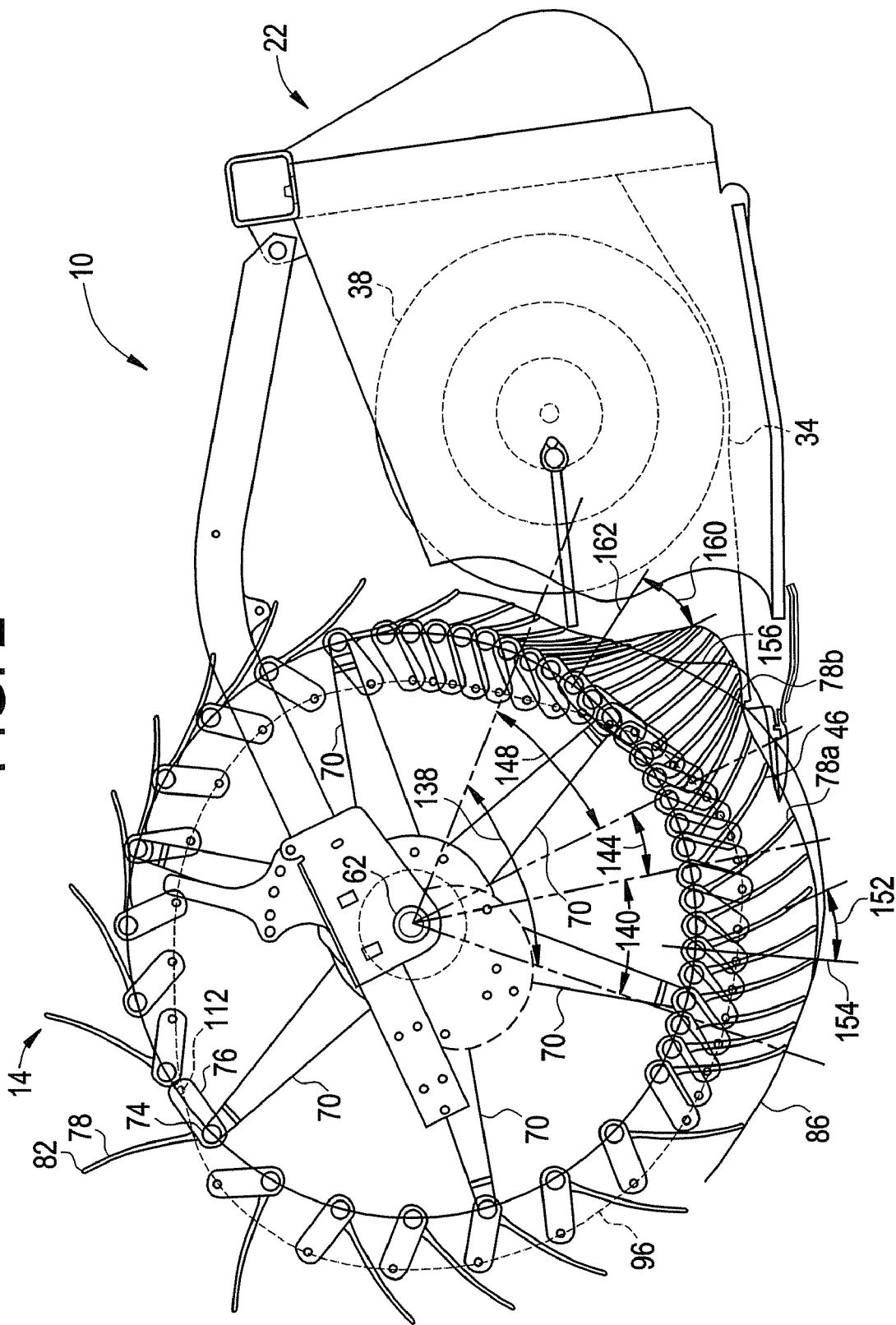
FIG. 2 is a side view similar to that in FIG. 1 and illustrating the tip path.
Figure 3:
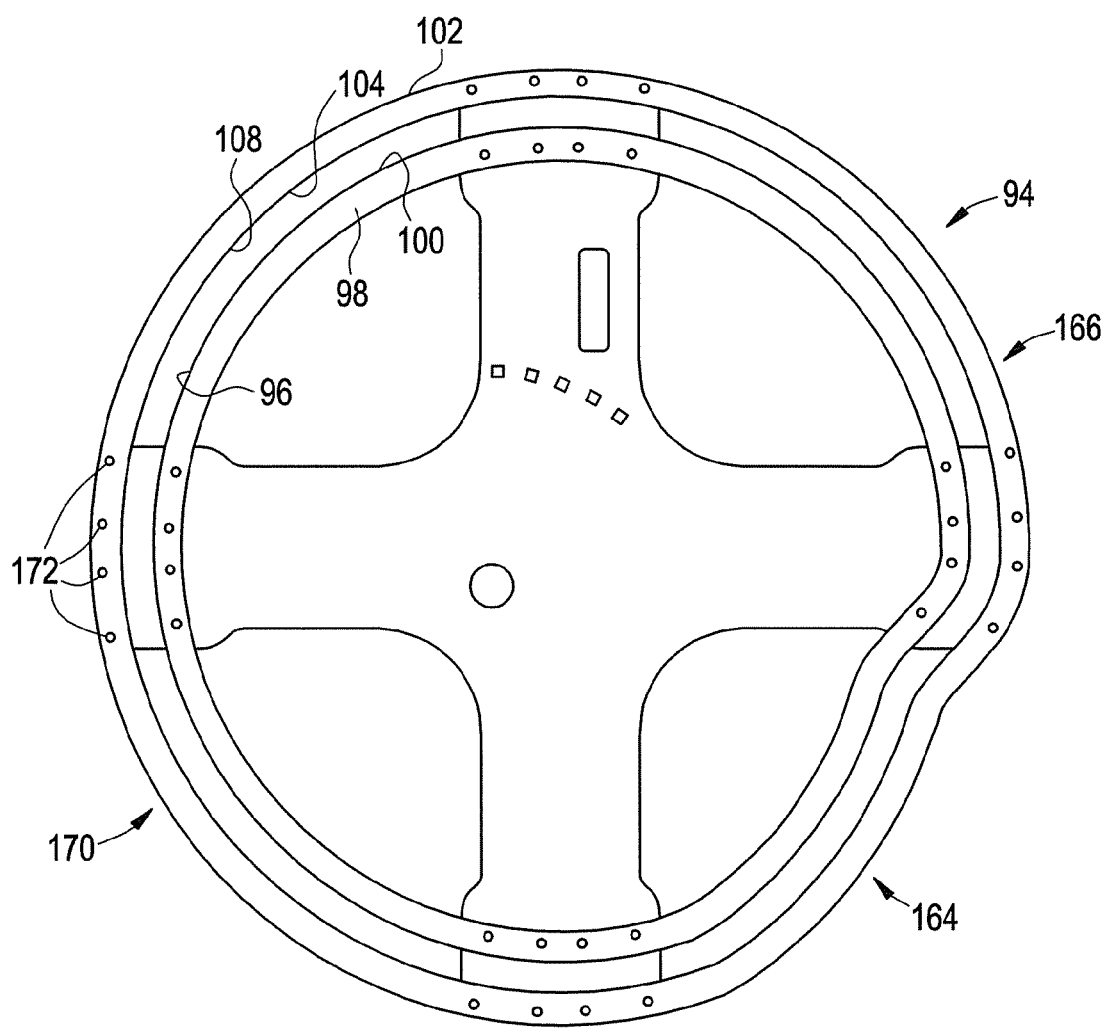
FIG. 3 is a side view of a portion of the harvester including the cam.
Figure 4:
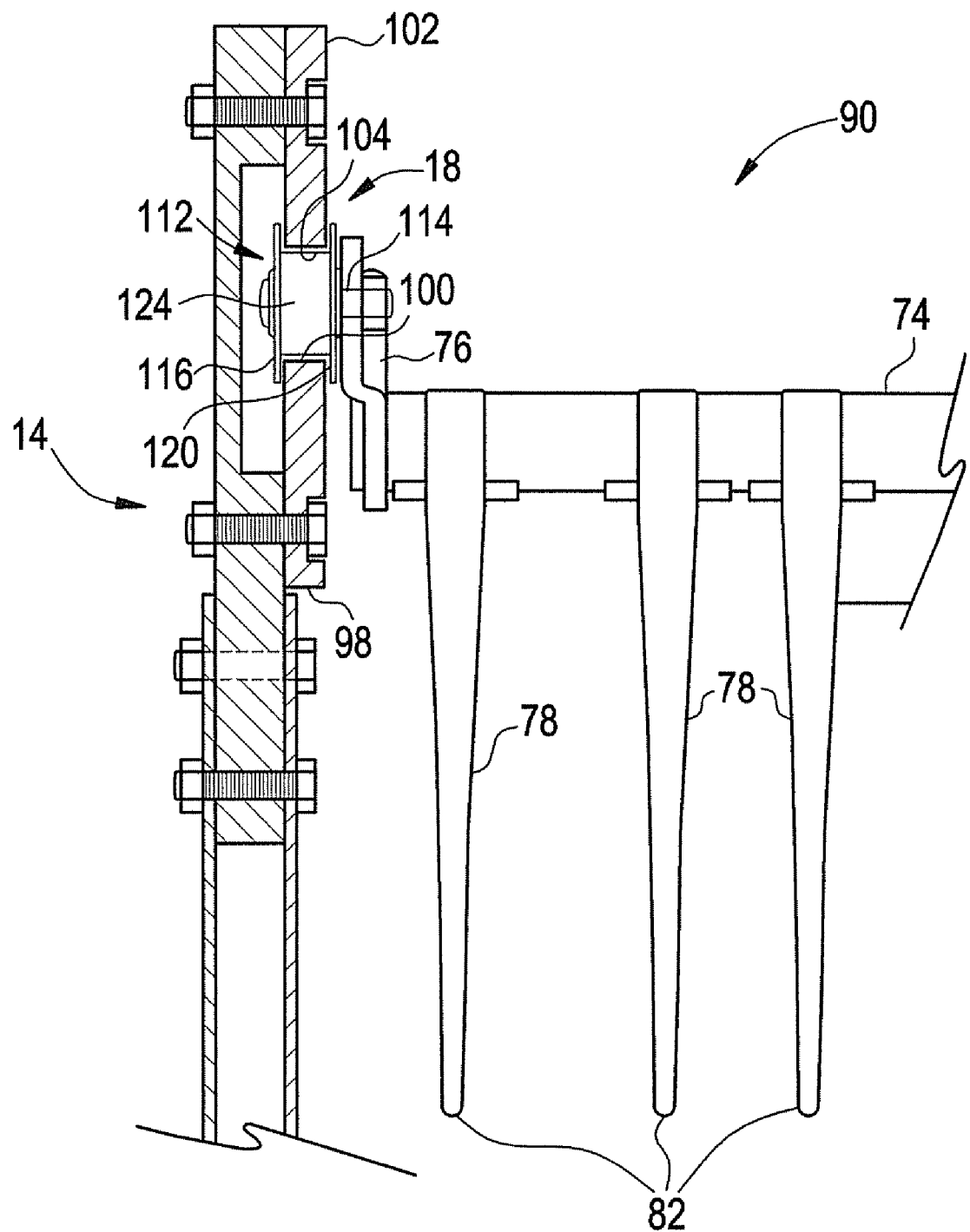
FIG. 4 is a partial cross-sectional view of the cam path arrangement and the retainer.
Figure 5:
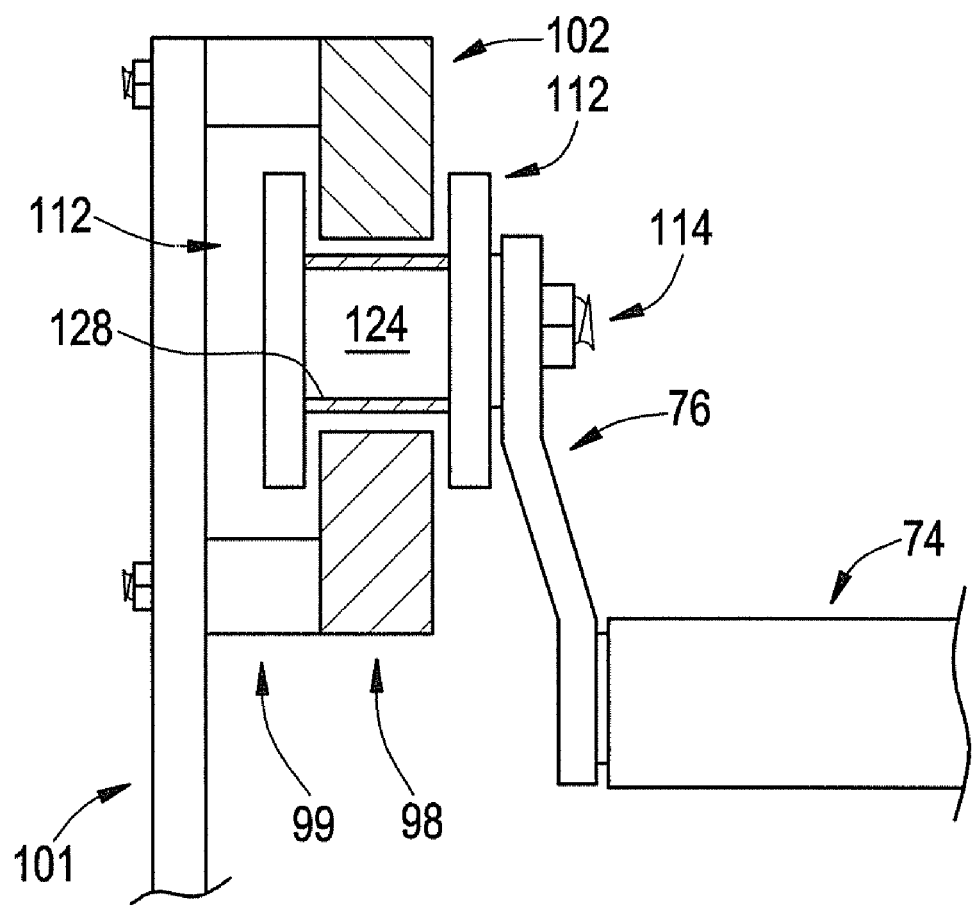
FIG. 5 is a partial cross-sectional view similar to that in FIG. 4.

While the invention may be susceptible to embodiment in different forms, there is shown in the drawings, and herein will be described in detail, a specific embodiment of the invention. The present disclosure is to be considered an example of the principles of the invention, and is not intended to limit the invention to that which is illustrated and described herein.

While FIGS. 1-5 illustrate a pickup reel for a harvester, where the design solves many problems experienced in the prior art (discussed at length in the '164 application), the present invention adds structure to the design to effectively prevent the bat tubes 74 from reversing as the pickup reel 14 rotates. Reversing of the bat tubes 74 by the cam followers going "over center" at the transition points is disadvantageous as it will cause the tines 78 to enter the crop at the wrong angle, causing crop damage and ineffective feeding of the crop into the harvesting machine 10.

FIGS. 6-9 illustrate a system which is in accordance with an embodiment of the present invention. The system provides that a pair of stops 200, 202 are provided on each of the reel arms 70 at the end of a pickup reel 14 (alternatively, stops can be provided at both ends of the pickup reel 14). Regardless, the stops 200, 202 are configured to define the range of rotation of the bat tube 74. In other words, the stops 200, 202 prevent the corresponding bat tube 74 from being able to rotate in a 360 degree angle in either direction. Instead, the stops 200, 202 define a range of rotation of about 180 degrees.

A specific embodiment of the present invention provides that each of the stops 200, 202 is generally a J-shaped member having a longitudinal wall 204, 206 and a hook portion 208, 210. The longitudinal wall 204, 206 of each of the stops 200, 202 includes a hole 220, 222 for receiving a fastener 224. Specifically, preferably the stops 200, 202 are configured such that a single fastener 224 can be used to secure both stops 200, 202 to the reel arm 70. A M10×70 bolt 226 can be used to secure the stops 200, 202, along with a cupped washer 228 and an M10 nut 230. As shown, the bolt 226 extends through a hole 222 in the one stop 202, through the cupped washer 228, through the reel arm 70, through a bracket 232 which secures the bat tube 74 to the reel arm 70, and through a hole 220 in the other stop 200. Finally, the nut 230 threads onto the end 236 of the bolt 226. Of course, other types of fasteners and fastening arrangements can be used.

Figure 7:
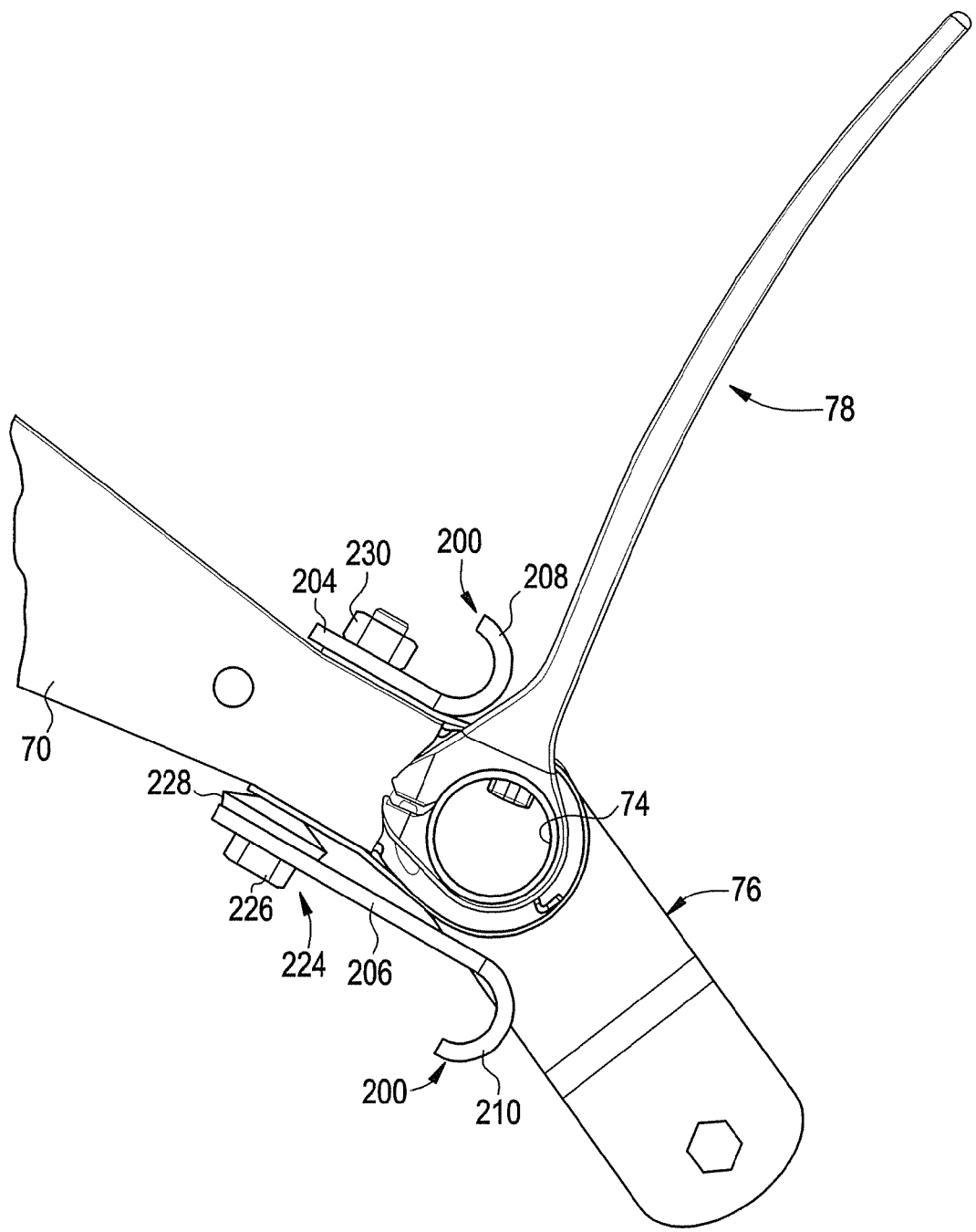
FIG. 7 illustrates one of the stops preventing a bat tube from over-rotating in one direction.
Figure 8:
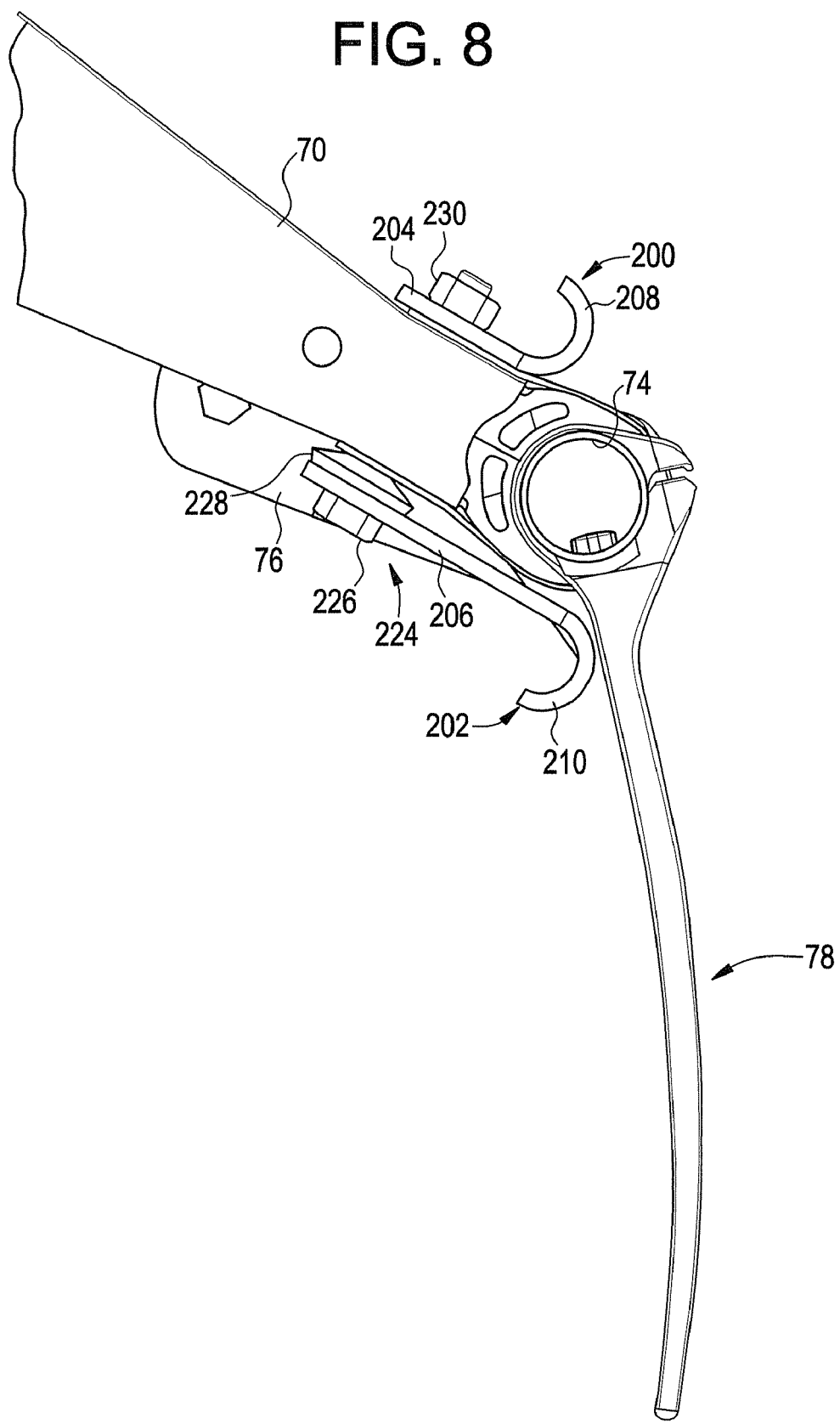
FIG. 8 illustrates another one of the stops preventing the bat tube from over-rotating in the other direction.
Figure 9:
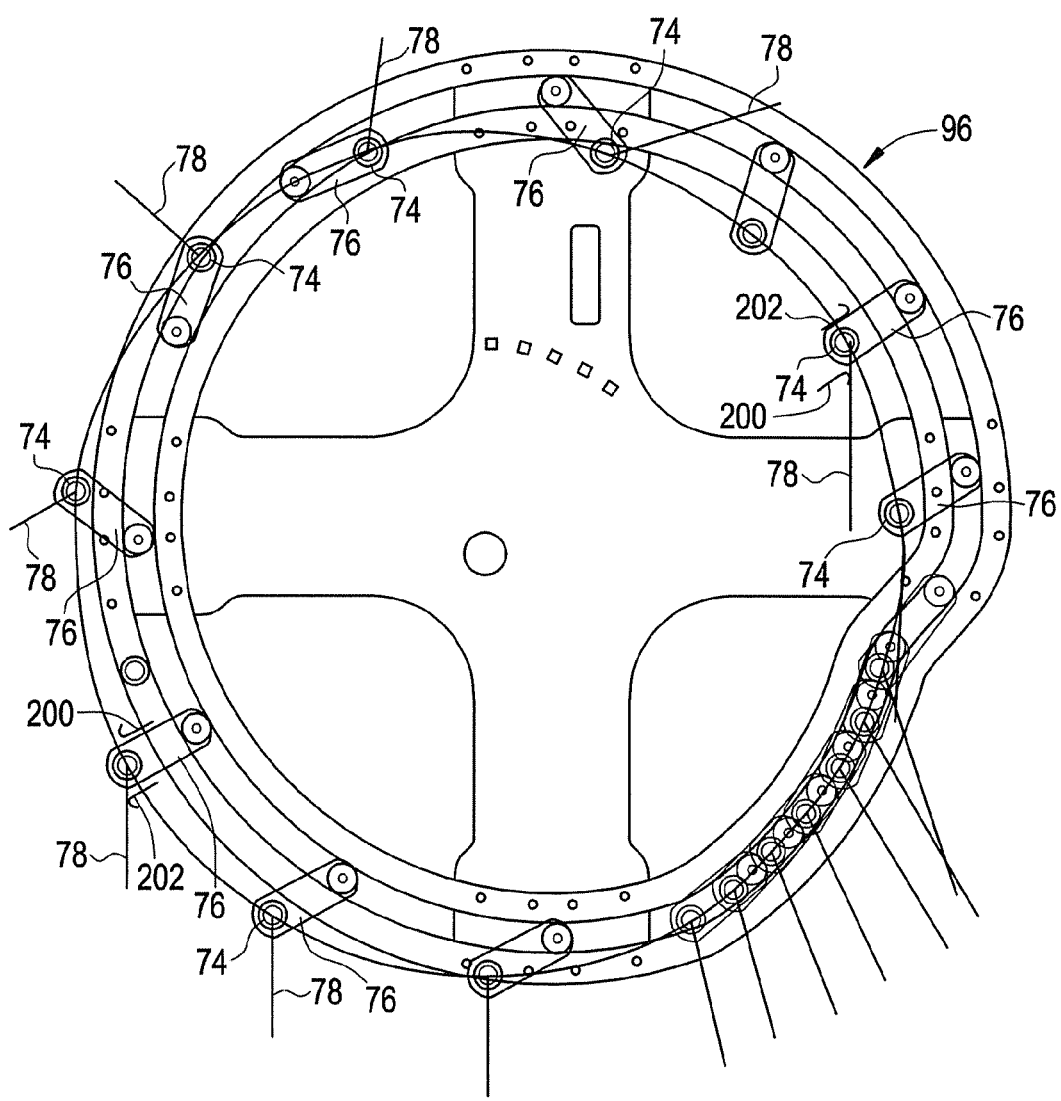
FIG. 9 is a schematic, side view which shows the cam path in association with the stops performing their function.

Regardless, the stops 200, 202 provide that upon rotation of the pickup reel 14, a tine 78 on the bat tube 74 contacts the stops 200, 202 at different times during rotation of the pickup reel 14, thereby defining a range of rotation of the bat tube 74. FIG. 7 shows stop 200 contacting the tine 78 and preventing the bat tube 74 from continuing to rotate in one direction (i.e., counter-clockwise in FIG. 7), and FIG. 8 shows stop 202 contacting the tine 78 and preventing the bat tube 74 from continuing to rotate in the other direction (i.e., clockwise in FIG. 8). As such, the stops 200, 202 define the range of rotation of the bat tube 74 and work to prevent crop from being tangled on the bat tube 74. FIG. 9 shows the cam path 96 and further illustrates the function of the stops 200, 202 in preventing over-rotation of the bat tubes 74.

Figure 6:
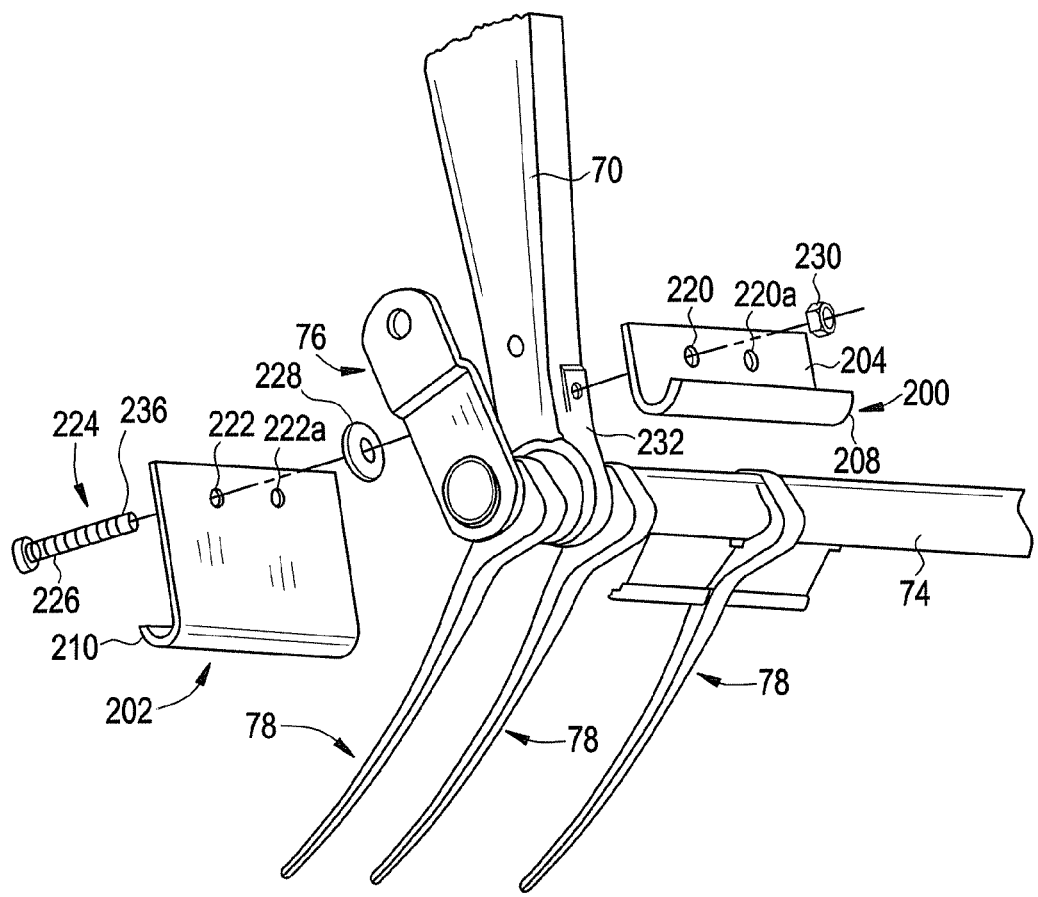
FIG. 6 is an exploded view of a system which is in accordance with the present invention, wherein stops are provided for restricting rotation of a bat tube.

As shown in FIG. 6, each stop 200, 202 may be provided with a pair of holes 220, 220a and 222, 222a, thereby providing that the stops 200, 202 can be used on either end of the bat tube. For example, FIG. 6 illustrates the stops 200, 202 being used on the left end of the bat tube 74. However, the stops 200, 202 can also be used at the other end of the bat tube 74, in which case the fastener 224 extends through the other holes 220a, 222a on the stops 200, 202.

As described and as shown in FIGS. 6-9, the stops 200, 202 contact a tine 78 to prevent over-rotation of the bat tube 74. This arrangement reduces the risk of causing damage to expensive parts of the pickup reel 14. At most, the stops 200, 202 will shear hubs on a tine 78, and tines are inexpensive and easy to replace.

As discussed, a pair of stops 200, 202 can be provided on each of the reel arms 70 which are located at an end of a pickup reel 14, thereby preventing over-rotation of each and every reel tube 74 of the pickup reel 14. If the reel tubes are long, stops can be provided on both ends of the pickup reel 14, on each of the reel arms which are located at the ends of the pickup reel 14. For example, stops 200, 202 as described above can be provided on each of the reel arms 70 at end 300 of the pickup reel 14 for contacting one or more of tines 302. Additionally, stops 200, 202 as described above can be provided on each of the reel arms 70 at end 304 of the pickup reel 14 for contacting one or more of tines 306. Still other manners of implementing the present invention are entirely possible while staying within the scope of the present invention.

While an embodiment of the present invention is shown and described, it is envisioned that those skilled in the art may devise various modifications of the present invention without departing from the spirit and scope of the foregoing disclosure.

What is claimed is:

1. A pickup reel for a harvester, said pickup reel comprising:
   a main shaft;
   a plurality of reel arms which extend from the main shaft;
   a plurality of bat tubes, each bat tithe being engaged with a plurality of the reel arms, the bat tubes being parallel to each other and parallel to the main shaft;
   a plurality of tines on each of the bat tubes; and
   first and second stops configured to contact at least one of the tines thereby defining a range of allowable rotation of each bat tube, said first stop defining a limit of said range of allowable rotation of the bat tube in a first direction, said second stop defining a limit of said range of allowable rotation of the bat tube in a second direction, said first stop being secured to a first side of one of said reel arms, said second stop being secured to a second side of said one of said reel arms, each stop includes a pair of holes configured to receive a fastener, said pair of holes being separated from one another in a manner where said pair of holes are parallel to said bat tubes, said fastener being received through one of said holes when the stop is used on a first end of a bat tube, said fastener being received through the other one of said holes when the stop is used on a second end of a bat tube, wherein said first and second stops span only a portion of a distance between adjacent reel arms.

2. The pickup reel as defined in claim 1, further comprising a crank arm which is disposed proximate ends of each bat tube, and a cam follow which is engaged with each crank arm and which is configured to travel in a cam path.

3. The pickup reel as defined in claim 1, wherein the first and second stops are configured such that a single fastener is useable to secure both the first stop and the second stop to one of the reel arms.

4. The pickup reel as defined in claim 3, wherein each of the stops is a J-shaped member having a longitudinal wall and a hook portion.

5. The pickup reel as defined in claim 4, wherein the longitudinal wall is configured to engage the reel aim, and the hook portion is configured to engage at least one of the tines and prevent further rotation of the bat tube.

6. The pickup reel as defined in claim 5, wherein the longitudinal wall of each of the stops includes whole the pair of holes for receiving the listener.

7. The pickup reel as defined in claim 1, wherein each of the stops is a J-shaped member having a longitudinal wall and a hook portion.

8. The pickup reel defined in claim 7, wherein the longitudinal wall is configured to engage the reel arm, and the hook portion is configured to engage a tine and prevent further rotation of the bat tube.

9. The pickup reel as defined in claim 8, wherein the longitudinal wall of each of the stops includes the pair of holes for receiving the fastener.

10. The pickup reel as defined in claim 1, wherein the first and second stops are configured such that a single fastener is useable to secure both the first stop and the second stop to one of the reel arms.

11. The pickup reel as defined in claim 1, wherein said range of allowable rotation of said bat tube is approximately 180 degrees.

* * * * *

UNITED STATES PATENT AND TRADEMARK OFFICE
CERTIFICATE OF CORRECTION

PATENT NO. : 7,665,287 B2  Page 1 of 1
APPLICATION NO. : 11/772585
DATED : February 23, 2010
INVENTOR(S) : Dennis J. Jones It is certified that error appears in the above-identified patent and that said Letters Patent is hereby corrected as shown below:

Title Page

(75) Inventor: Dennis J. Jones, "Menota, IL (US)"

should read -- Dennis J. Jones, Mendota, IL (US) --

Column 2, Line 3 "anus 70." should read -- arms 70 --

Column 3, Line 53 "The earn path" should read

-- The cam path --

Column 3, Line 54 "earn channel 108" should read

-- cam channel 108 --

Column 3, Line 55 "earn follower 112" should read

-- cam follower 112 --

Column 3, Line 56 "The earn follower 112" should read

-- The cam follower 112 --

Column 3, Line 60 "earn path 96" should read

-- cam path 96 --

Column 3, Line 62 "earn follower 112" should read

-- cam follower 112 --

Column 4, Line 2 "of the earn 94." should read

-- of the cam 94. --

Column 8, Line 9 "the reel aim," should read

-- the reel arm, --

Signed and Sealed this

Fourth Day of May, 2010

David J. Kappos
*Director of the United States Patent and Trademark Office*